United States Patent
Imada

(10) Patent No.: US 9,534,067 B2
(45) Date of Patent: Jan. 3, 2017

(54) MODIFYING AGENT, RESIN COMPOSITION, AND RESIN MOLDED ARTICLE

(71) Applicant: FUJI XEROX CO., LTD., Tokyo (JP)

(72) Inventor: Akira Imada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 82 days.

(21) Appl. No.: 14/594,454

(22) Filed: Jan. 12, 2015

(65) Prior Publication Data
US 2016/0017067 A1  Jan. 21, 2016

(30) Foreign Application Priority Data
Jul. 15, 2014 (JP) .................................. 2014-144904

(51) Int. Cl.
| | | |
|---|---|---|
| C08L 67/08 | (2006.01) | |
| C08L 67/00 | (2006.01) | |
| C08K 3/34 | (2006.01) | |
| C08F 220/18 | (2006.01) | |
| C08J 3/24 | (2006.01) | |
| C08L 67/04 | (2006.01) | |

(52) U.S. Cl.
CPC ............ C08F 220/18 (2013.01); C08J 3/246 (2013.01); C08K 3/346 (2013.01); C08L 67/04 (2013.01); C08J 2333/10 (2013.01); C08J 2367/04 (2013.01)

(58) Field of Classification Search
None
See application file for complete search history.

(56) References Cited

U.S. PATENT DOCUMENTS

| | | | | |
|---|---|---|---|---|
| 3,660,537 A | * | 5/1972 | Fryd .................... | C08F 265/06 524/315 |
| 4,900,569 A | * | 2/1990 | Le ........................ | C08F 226/06 526/245 |
| 2004/0034121 A1 | | 2/2004 | Nozaki et al. | |

FOREIGN PATENT DOCUMENTS

| | | |
|---|---|---|
| JP | A 2004-75772 | 3/2004 |
| JP | A 2008-156616 | 7/2008 |

* cited by examiner

*Primary Examiner* — Michael J Feely
(74) *Attorney, Agent, or Firm* — Oliff PLC

(57) ABSTRACT

A modifying agent includes an acrylic copolymer containing an acrylic acid ester monomer unit, a methacrylic acid ester monomer unit, a monomer unit of a compound represented by Formula (1), and a cationic monomer unit:

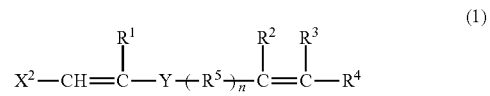

wherein, in the formula, $R^1$ is a hydrogen atom or a methyl group; $R^2$, $R^3$, and $R^4$ are hydrogen atoms or organic groups having 1 to 10 carbon atoms in which hydrogen does not exist in carbon adjacent to a double bond; $R^5$ is an organic group having 1 to 10 carbon atoms in which hydrogen does not exist in carbon adjacent to a double bond; $X^2$ is a hydrogen atom; Y is

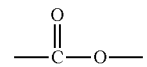

or —O—; and n is 1 or 0.

4 Claims, No Drawings

MODIFYING AGENT, RESIN COMPOSITION, AND RESIN MOLDED ARTICLE

CROSS-REFERENCE TO RELATED APPLICATIONS

This application is based on and claims priority under 35 USC 119 from Japanese Patent Application No. 2014-144904 filed Jul. 15, 2014.

BACKGROUND

1. Technical Field

The present invention relates to a modifying agent, a resin composition, and a resin molded article.

2. Related Art

In the related art, various resin compositions are provided for various uses. For example, the resin compositions are used in resin molded articles of various components, housings, and the like of home appliances or vehicles, or used in the resin molded articles of housings of office machines, electric and electronic apparatuses, and the like.

In addition, in view of the protection of the environment, a combination of a biodegradable resin which is a more environmentally friendly material is studied. Among them, a plant-based polylactic acid resin is receiving attention. Also, resin compositions in which fillers or modifying agents are combined with the polylactic acid resins have been studied in order to enhance the mechanical characteristics and heat resisting properties of a resin molded article obtainable from a resin composition including the polylactic acid resin.

SUMMARY

According to an aspect of the invention, there is provided a modifying agent including:

an acrylic copolymer containing an acrylic acid ester monomer unit, a methacrylic acid ester monomer unit, a monomer unit of a compound represented by Formula (1), and a cationic monomer unit:

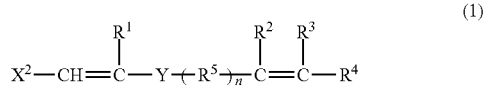

(1)

wherein, in the formula, $R^1$ is a hydrogen atom or a methyl group; $R^2$, $R^3$, and $R^4$ are hydrogen atoms or organic groups having 1 to 10 carbon atoms in which hydrogen does not exist in carbon adjacent to a double bond; $R^5$ is an organic group having 1 to 10 carbon atoms in which hydrogen does not exist in carbon adjacent to a double bond; $X^2$ is a hydrogen atom; Y is

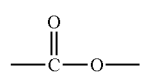

or —O—; and n is 1 or 0.

DETAILED DESCRIPTION

Exemplary embodiments of the invention are described below. The embodiments are provided as examples, and do not intend to limit the invention.

Modifying Agent

A modifying agent according to the embodiment is a modifying agent containing an acrylic copolymer including an acrylic acid ester monomer unit, a methacrylic acid ester monomer unit, a monomer unit of a compound represented by Formula (1) described below, and a cationic monomer unit.

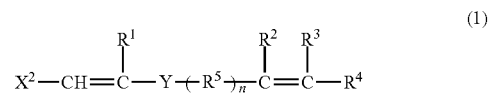

(1)

In the formula, $R^1$ is a hydrogen atom or a methyl group, $R^2$, $R^3$, and $R^4$ are hydrogen atoms or organic groups having 1 to 10 carbon atoms in which hydrogen does not exist in carbon adjacent to a double bond, $R^5$ is an organic group having 1 to 10 carbon atoms in which hydrogen does not exist in carbon adjacent to a double bond, $X^2$ is a hydrogen atom, Y is

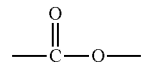

or
—O—, and n is 1 or 0.

In the related art, considering the environment, use of a polylactic acid resin which is a biodegradable resin as a raw material of a resin molded article is known. In addition, a layered silicate is known as a filler that enhances a heat resisting property of a resin molded article. However, if a polylactic acid resin and a layered silicic acid are unevenly distributed in the resin composition, the heat resisting property or the impact resistance of the resin molded article may not sufficiently be obtained.

It is considered that a modified polylactic acid resin having a structure in which a vinyl group in a monomer unit of the compound represented by Formula (1) above and a carbon atom that constitutes a polylactic acid resin are bonded is formed by combining a modifying agent including an acrylic copolymer according to the embodiment to the resin composition. In addition, since the intercalation portion of the layered silicate is mainly composed of a positive ion, it is considered that the modified polylactic acid resin which is ion-exchanged with a cation of the cationic monomer in the modifying agent and is modified with the modifying agent is inserted into the intercalation portion of the layered silicate. Therefore, the polylactic acid resin and the layered silicic acid are thought to be integrated and dispersed in the resin composition. Accordingly, it is considered that the uneven distribution of the polylactic acid resin and the layered silicic acid is prevented by using the modifying agent including the acrylic copolymer according to the embodiment compared with a case in which a copolymer including an acrylic acid ester monomer unit and a methacrylic acid ester monomer unit is used as the modifying agent, so that the heat resisting property and the impact resistance of an obtainable resin molded article is enhanced.

Hereinafter, the respective components of the modifying agent including the acrylic copolymer according to the embodiment are described.

Acrylic Acid Ester Monomer Unit

The acrylic acid ester monomer unit is included as a component of the acrylic copolymer. For example, constituent units derived from monomers such as methyl acrylate, ethyl acrylate, propyl acrylate, butyl acrylate, isobutyl acrylate, n-octyl acrylate, dodecyl acrylate, 2-ethylhexyl acrylate, stearyl acrylate, phenyl acrylate, and dimethylaminoethyl acrylate are included, and the constituent units may be used singly, or two or more types thereof are used in combination.

In the acrylic copolymer, for example, the constituent unit exists as a polymer block configured with the acrylic acid ester monomer unit. With respect to the molecular weight of the polymer block configured with the acrylic acid ester monomer unit, the weight average molecular weight is preferably in the range of 6,000 to 1,000,000, and more preferably in the range of 10,000 to 800,000. If the weight average molecular weight of the polymer block including the acrylic acid ester monomer unit is less than 6,000, the dispersion in the resin may be insufficient, and if the weight average molecular weight exceeds 1,000,000, the copolymers may aggregate.

The weight average molecular weight is measured by the gel permeation chromatography (GPC). The molecular weight measurement by the GPC is performed with a THF solvent by using HLC-8120, which is GPC manufactured by Tosoh Corporation, as a measurement device, and using TSKgel Super (15 cm), which is a column manufactured by Tosoh Corporation. The weight average molecular weight is calculated by using the molecular weight calibration curve produced with the monodispersed polystyrene standard sample from the measurement result. The same shall apply hereafter regarding the measurement of the weight average molecular weight.

The content of the acrylic acid ester monomer unit in the acrylic copolymer is preferably in the range of 15% by weight to 90% by weight, and more preferably in the range of 20% by weight to 70% by weight. If the content of the acrylic acid ester monomer unit is out of the range, the impact resistance may not be sufficiently enhanced.

Methacrylic Acid Ester Monomer Unit

The methacrylic acid ester monomer unit is included as a component of the acrylic copolymer. For example, constituent units derived from monomers such as methyl methacrylate, ethyl methacrylate, propyl methacrylate, butyl methacrylate, hexyl methacrylate, cyclohexyl methacrylate, octyl methacrylate, nonyl methacrylate, octadecyl methacrylate, dodecyl methacrylate, 2-ethylhexyl methacrylate, and glycidyl methacrylate are included, and the constituent units may be used singly, or two or more kinds thereof may be used in combination.

In the acrylic copolymer, for example, the constituent unit exists as a polymer block configured with the methacrylic acid ester monomer unit. With respect to the molecular weight of the polymer block configured with the methacrylic acid ester monomer unit, the weight average molecular weight is preferably in the range of 1,000 to 1,000,000, is more preferably in the range of 2,000 to 750,000. If the weight average molecular weight of the polymer block including the methacrylic acid ester-derived constituent unit is less than 1,000, the dispersion in the resin may be insufficient, and if the weight average molecular weight exceeds 1,000,000, the copolymers may aggregate.

For example, the content of the methacrylic acid ester monomer unit in the acrylic copolymer is preferably in the range of 15% by weight to 80% by weight, and is more preferably in the range of 20% by weight to 70% by weight. If the content of the methacrylic acid ester monomer unit is out of the range, a sufficient dispersion property may not be obtained.

Monomer unit of compound represented by Formula (1) below (hereinafter, also collectively referred to as vinyl group-containing compound monomer unit)

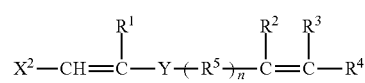

In the formula, $R^1$ is a hydrogen atom or a methyl group, $R^2$, $R^3$, and $R^4$ are hydrogen atoms or organic groups having 1 to 10 carbon atoms in which hydrogen does not exist in carbon adjacent to a double bond, $R^5$ is an organic group having 1 to 10 carbon atoms in which hydrogen does not exist in carbon adjacent to a double bond, $X^2$ is a hydrogen atom, Y is

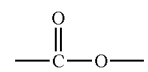

or

—O—, and n is 1 or 0.

As the organic groups having 1 to 10 carbon atoms, for example, a methyl group and an ethyl group are included.

The monomer unit of the compound represented by Formula (1) is a monomer unit of the compound having a vinyl group (hereinafter, collectively referred to as a vinyl group-containing compound monomer unit in some cases). The vinyl group-containing compound monomer unit is included as a component of the acrylic copolymer. For example, constituent units derived from monomers such as vinyl acrylate, vinyl methacrylate, 1,1-dimethylpropenyl acrylate, 1,1-dimethylpropenyl methacrylate, 3,3-dimethylbutenyl acrylate, 3,3-dimethylbutenyl methacrylate, divinyl itaconate, divinyl maleate, divinyl fumarate, vinyl 1,1-dimethylpropenyl ether, vinyl 3,3-dimethylbutenyl ether, 1-acryloyloxy-1-phenylethene, 1-acryloyloxy-2-phenylethene, 1-methacryloyloxy-1-phenylethene, and 1-methacryloyloxy-2-phenylethene are included. The constituent units are used singly, or two or more types thereof may be used in combination. Among them, in view of the impact resistance of the obtainable resin molded article and the like, vinyl acrylate and vinyl methacrylate are preferable.

In the acrylic copolymers, for example, the constituent units exist as a polymer block configured with the vinyl group-containing compound monomer unit. The molecular weight of the polymer block configured with the vinyl group-containing compound monomer unit is, for example, as a weight average molecular weight, preferably in the range of 1,000 to 1,000,000, and more preferably in the range of 2,000 to 750,000. If the weight average molecular weight of the polymer block containing the vinyl group-containing compound monomer unit is less than 1,000, sufficient reactivity may not be obtained, and if the weight average molecular weight exceeds 1,000,000, polymers may be cross-linked with each other.

The content of the vinyl group-containing compound monomer unit in the acrylic copolymer is preferably in the range of 1% by weight to 20% by weight, and preferably in the range of 5% by weight to 10% by weight. If the content of the vinyl group-containing compound monomer unit is out of the range, sufficient cross-linking effect may not be obtained.

Cationic Monomer Unit

The cationic monomer unit is included as a component of the acrylic copolymer, and is for example, a compound having at least one cationic group. The cationic group is, for example, an amine group, a pyridinium group, and a sulfonium group.

The cationic monomer unit includes, for example, the followings. In addition, "(meth)acryl" means acryl or methacryl. Specifically, constituent units derived from monomers such as alkylaminoalkyl (meth)acrylates such as methylaminomethyl (meth)acrylate, methylaminoethyl (meth)acrylate, and methylaminopropyl (meth)acrylate, dialkylaminoalkyl (meth)acrylates such as dimethylaminomethyl (meth)acrylate, dimethylaminoethyl (meth)acrylate, dimethylaminopropyl (meth)acrylate, diethylaminomethyl (meth)acrylate, diethylaminoethyl (meth)acrylate, and diethylaminopropyl (meth)acrylate, and vinyl pyridines such as 2-vinyl pyridine and 4-vinyl pyridine, and a sulfide compound are included. These cationic monomer units may be used singly, or two or more kinds thereof are used in combination.

It is considered that the cationic group of the cationic monomer unit is a cationic functional group of the acrylic copolymer. Also, since the acrylic copolymer of which an amino group or a pyridinium group is the cationic functional group has more enhanced impact resistance and the more enhanced heat resisting property of the obtainable resin molded article than the acrylic copolymer of which the sulfonium group is a cationic functional group, the acrylic copolymer of which an amino group or a pyridinium group is the cationic functional group is more preferable. Accordingly, it is preferable to prepare the acrylic copolymer having an amino group or a pyridinium group by using monomers such as dialkylaminoalkyl (meth)acrylates and vinyl pyridines.

In the acrylic copolymer, for example, the constituent units exist as a polymer block configured with a cationic monomer unit. With respect to the molecular weight of the polymer block configured with a cationic monomer unit, the weight average molecular weight is, for example, preferably in the range of 1,000 to 1,000,000, and more preferably in the range of 2,000 to 750,000. If the weight average molecular weight of the polymer block configured with the cationic monomer unit is less than 1,000, or exceeds 1,000,000, the dispersion of the layered silicate may be insufficient.

The content of the cationic monomer unit in the acrylic copolymer is, for example, preferably in the range of 0.5% by weight to 20% by weight, and more preferably in the range of 1% by weight to 10% by weight. The content of the cationic monomer unit is out of the range, the dispersion of the layered silicate may be insufficient.

As a method of manufacturing the acrylic copolymer, for example, a living polymerization method of monomers that configure the respective monomer units is included. As the living polymerization method, for example, an anionic polymerization method in the presence of mineral acid salt such as a salt of alkali metal or alkaline earth metal using an organic alkali metal compound as a polymerization initiator, an anionic polymerization method in the presence of an organic aluminum compound using an organic alkali metal compound as a polymerization initiator, a polymerization method using an organic rare earth metal complex as the polymerization initiator, and a radical polymerization method in the presence of a copper compound using an α-halogenated ester compound as the initiator are included.

The modifying agent according to the embodiment may include other components to the extent that does not deteriorate the heat resisting property and the impact resistance of the obtainable resin molded article in addition to the acrylic copolymer described above. The other components include, for example, various kinds of pigments and compatibilizers. The content of the other components in the modifying agent is, for example, preferably 10% by weight or less, and more preferably 5% by weight or less.

Resin Composition

The resin composition according to the embodiment is a resin composition including a modified polylactic acid resin modified by a modifying agent including an acrylic copolymer including an acrylic acid ester monomer unit, a methacrylic acid ester monomer unit, a monomer unit of a vinyl group-containing compound (compound represented by Formula (1) described above), and a cationic monomer unit, and layered silicate. As described above, it is considered that the modified polylactic acid resin in the resin composition according to the embodiment has a structure in which the vinyl group in the monomer unit of the vinyl group containing compound (compound represented by Formula (1) described above) and a carbon atom configuring a polylactic acid resin are bonded. In addition, it is considered that the positive ion of the intercalation portion of the layered silicate is exchanged with the cation of the cationic monomer unit configuring the acrylic copolymer, and the modified polylactic acid resin is inserted into the intercalation portion of the layered silicate. Therefore, the resin composition according to the embodiment including the layered silicate and the modified polylactic acid resin modified with the modifying agent has a state in which the polylactic acid resin and the layered silicic acid are dispersed, and thus it is considered that the heat resisting property and the impact resistance of the obtainable resin molded article are improved compared with the resin composition configured with the layered silicate and the polylactic acid resin modified by the copolymer including the acrylic acid ester monomer unit and the methacrylic acid ester monomer unit.

The content of the acrylic copolymer included in the resin composition according to the embodiment is preferably in the range of 1.5% by weight to 9% by weight, and more preferably in the range of 1.5% by weight to 5% by weight with respect to 100 parts by weight of polylactic acid resin. If the content of the acrylic copolymer is in the range described above, the impact resistance and the heat resisting property of the obtainable resin molded article may be more enhanced than the case in which the content of the acrylic copolymer is out of the range.

Polylactic Acid Resin

The polylactic acid resin is not particularly limited as long as the polylactic acid resin is a lactic acid condensate, and may be a poly-L-lactic acid resin, a poly-D-lactic acid resin, or a mixture thereof (for example, a stereo complex polylactic acid resin in which the poly-L-lactic acid resin and the poly-D-lactic acid resin are mixed). In addition, as the polylactic acid resin, a synthesized resin may be used, or a commercial product may be used. As the commercial product, for example, "Terramac TE4000", "Terramac TE2000", and "Terramac TE7000" manufactured by Unitika Ltd., "LACER H100", manufactured by Mitsui Chemicals, Inc. and "Ingeo 3001D" manufactured by NatureWorks LLC are included.

With respect to the molecular weight of the polylactic acid resin, the weight average molecular weight is, for example, preferably in the range of 8,000 to 200,000, is more preferably in the range of 15,000 to 120,000. If the weight average molecular weight of the polylactic acid resin is less than 8,000 or greater than 200,000, the heat resisting property of the obtainable resin molded article may be decreased.

The content of the polylactic acid resin according to the embodiment is preferably in the range of 80% by weight to 99.9% by weight, and more preferably in the range of 90% by weight to 99% by weight of the total amount of the resin composition. If the content of the polylactic acid resin is less than 80% by weight of the total amount of the resin composition, biodegradability of the obtainable resin molded article may decreases, and if the content of the polylactic acid resin exceeds 99.9% by weight, the impact resistance of the obtainable resin molded article may decreases.

Layered Silicate

The layered silicate has a layered shape obtained by forming one sheet of plate-shaped crystal layer having a sandwich-shaped three-layered structure in which the two silicic acid tetrahedral layers interpose the octahedral layer including magnesium or aluminum therebetween, and laminating the crystal layers. The layered silicate includes, for example, smectite-group clay and mica.

Examples of the smectite-group clay include montmorillonite, beidellite, nontronite, saponite, iron saponite, hectorite, sauconite, stevensite, and bentonite, substitutes thereof, derivatives, or mixtures thereof.

Examples of mica include fluorine mica such as lithium-type taeniolite, sodium-type taeniolite and Na-type fluoride tetra-silicic mica, lithium-type tetra-silicic mica, and sodium-type tetra-silicic mica.

The layered silicate preferably has water-swelling property, and the water-swelling layered silicate may have more enhanced impact resistance and more enhanced heat resisting property of the obtainable resin molded article than the nonswellable layered silicate. Here, whether the layered silicate has water-swelling property may be determined by JBAS-104-77 according to the Standard Testing Method of Japan Bentonite Manufactures Association. 100 ml of ion exchange water is inserted to a graduated cylinder, 2.0 g of a sufficiently dried sample is inserted about 10 separate times so as not to be attached to the inner wall, and an apparent volume after standing for 24 hours is measured (swelling power: unit of ml/2 g). The water-swellability is defined by that value of the measured swellability is, for example, equal to or greater than 7 ml/2 g. Examples of the water-swelling layered silicate include water-swelling fluoride mica and water-swelling bentonite.

The method of preparing the resin composition according to the embodiment is not particularly limited, but it is preferable to adjust the resin composition by mixing the polylactic acid resin and the modifying agent including the aforementioned acrylic copolymer, modifying the polylactic acid resin with the modifying agent, and adding and mixing the layered silicate, in that the modification of the polylactic acid resin, and the insertion of the modified polylactic acid resin into the intercalation portion of the layered silicate are effectively performed.

Other Components

The resin composition according to the embodiment may include other components to the extent that does not deteriorate the heat resisting property and the impact resistance of an obtainable resin molded article. Examples of the other components include a flame retardant, a hydrolysis inhibitor, and an oxidation inhibitor.

Examples of the flame retardant include a phosphorus flame retardant, a silicone flame retardant, a nitrogen flame retardant, and an inorganic hydroxide flame retardant. Among these, in view of flame retardance, phosphorus flame retardant is preferable. As the flame retardant, synthesized flame retardant or a commercial product may be used. Examples of the commercial product of the phosphorus flame retardant include "CR-741" manufactured by Daihachi Chemical Industry Co., Ltd., "AP422" manufactured by Clariant, and "Nova Excel 140" manufactured by Rin Kagaku Kogyo Co., Ltd. Examples of the commercial product of the silicone flame retardant include "DC4-7081" manufactured by Dow Corning Toray Co. Ltd. Examples of the commercial product of nitrogen flame retardant include "Apinon 901" manufactured by Sanwa Chemical Co., Ltd. Examples of the commercial product of the inorganic hydroxide flame retardant include "MGZ300" manufactured by Sakai Chemical Industry Co., Ltd.

Examples of the hydrolysis inhibitor include a carbodiimide compound, and an oxazoline compound. Examples of the carbodiimide compound include dicyclohexylcarbodiimide, diisopropylcarbodiimide, dimethylcarbodiimide, diisobutyl carbodiimide, dioctyl carbodiimide, diphenyl carbodiimide, and naphthyl carbodiimide.

Examples of the oxidation inhibitor include phenol-based, amine-based, phosphorus-based, sulfur-based, hydroquinone-based, quinoline-based oxidation inhibitors.

Resin Molded Article

The resin molded article according to the embodiment is configured to include a resin composition according to the embodiment described above. The resin molded article according to the embodiment may be obtained by molding the resin molded article according to the exemplary embodiment by a molding method such as injection molding, extrusion molding, blow molding, and heat press molding. In the exemplary embodiment, in view of the dispersion property of the respective components in the resin molded article, the resin molded article is preferable to be those obtained by injection-molding the resin composition according to the embodiment.

The injection molding is performed by using a commercially available machine such as "NEX 150" manufactured by Nissei Plastic Industrial Co., Ltd., "NEX 70000" manufactured by Nissei Plastic Industrial Co., Ltd., and "SE50D" manufactured by Toshiba Machine Co., Ltd. At this point, in view of the resin melting temperature, the temperature of the cylinder is preferably in the range of 170° C. to 280° C. In addition, in view of the productivity, the mold temperature is preferably in the range of 30° C. to 120° C.

The resin molded article according to the embodiment is preferably used for electric and electronic apparatuses, home appliances, containers, and car upholstery materials. More specifically, examples of the use include housings, various kinds of components, and the like of home appliances or electric and electronic apparatuses, wrapping films, storage cases such as CD-ROM or DVD, tableware, food trays, bottles for beverages, and medicine wrapping materials. Among them, the components of the electric and electronic apparatuses are preferable. Specifically, the components of the electric and electronic apparatuses require high heat resisting property and high impact resistance. Also, a resin molded article having excellent impact resistance and an excellent heat resisting property may be obtained from a resin composition including a modified polylactic acid resin modified by a modifying agent including the acrylic copolymer, and a layered silicate.

EXAMPLE

Hereinafter, the invention is described in detail with reference to Examples and Comparative Examples, but the invention is not limited the Examples below.

Acrylic Copolymer A-1

In a reaction vessel including a thermometer and a stirring device, 150 parts by weight of ion exchange water, 2 parts by weight of sodium octylsulfate, 0.3 parts by weight of ammonium persulfate (polymerization initiator), 50 parts by weight of butyl acrylate, 40 parts by weight of methyl methacrylate as a methacrylic acid ester monomer unit, 5 parts by weight of vinyl acrylate as the monomer unit of the vinyl group containing compound (compound of Formula (1)), 5 parts by weight of 2-vinyl pyridine as the cationic monomer unit, and 0.01 parts by weight of t-dodecylmercaptan (molecular weight regulator) are input, and emulsion polymerization is performed at the temperature of 80° C. for 12 hours under stirring, and then the reaction is stopped to obtain an emulsion. The solid content concentration of the emulsion is 39%, and the polymerization conversion rate is 98%. 10% of dilute sulfuric acid is timely added to 4% by weight of an aqueous solution containing calcium chloride (coagulant) with respect to the amount of the nitrile copolymer rubber in the dispersion to adjust a pH value so that the pH value of the aqueous solution during coagulation become pH 2.0 which is the isoelectric point or less, wand the aqueous solution is poured to the emulsion under stirring to be coagulated, the coagulation is dried in a vacuum at 80° C. for 8 hours, to obtain an acrylic copolymer A-1.

Acrylic Copolymer A-2

An acrylic copolymer A-2 is obtained by performing the same operation as the acrylic copolymer A-1 except that 50 parts by weight of ethyl acrylate as the acrylic acid ester monomer unit, 30 parts by weight of methyl methacrylate and 10 parts by weight of glycidyl methacrylate as the methacrylic acid ester monomer units, 5 parts by weight of vinyl methacrylate as the monomer unit of the vinyl group containing compound (compound of Formula (1)), and 5 parts by weight of dimethylaminoethyl acrylate as the cationic monomer unit are used.

Acrylic Copolymer A-3

An acrylic copolymer A-3 is obtained by performing the same operation as the acrylic copolymer A-1 except that 70 parts by weight of butyl acrylate as the acrylic acid ester monomer unit, 20 parts by weight of methyl methacrylate as the methacrylic acid ester monomer unit, 5 parts by weight of vinyl acrylate as the monomer unit of the vinyl group containing compound (compound of Formula (1)), and 5 parts by weight of 2-vinyl pyridine as the cationic monomer unit are used.

Acrylic Copolymer A-4

An acrylic copolymer A-4 is obtained by performing the same operation as the acrylic copolymer A-1 except that 20 parts by weight of butyl acrylate as the acrylic acid ester monomer unit, 70 parts by weight of methyl methacrylate as the methacrylic acid ester monomer unit, 5 parts by weight of vinyl acrylate as the monomer unit of the vinyl group containing compound (compound of Formula (1)), and 5 parts by weight of 2-vinyl pyridine as the cationic monomer unit are used.

Acrylic Copolymer A-5

An acrylic copolymer A-5 is obtained by performing the same operation as the acrylic copolymer A-1 except that 53.5 parts by weight of butyl acrylate as the acrylic acid ester monomer unit, 40 parts by weight of methyl methacrylate as the methacrylic acid ester monomer unit, 1.5 parts by weight of vinyl acrylate as the monomer unit of the vinyl group containing compound (compound of Formula (1)), and 5 parts by weight of 2-vinyl pyridine as the cationic monomer unit are used.

Acrylic Copolymer A-6

An acrylic copolymer A-6 is obtained by performing the same operation as the acrylic copolymer A-1 except that 45 parts by weight of butyl acrylate as the acrylic acid ester monomer unit, 40 parts by weight of methyl methacrylate as the methacrylic acid ester monomer unit, 10 parts by weight of vinyl acrylate as the monomer unit of the vinyl group containing compound (compound of Formula (1)), and 5 parts by weight of 2-vinyl pyridine as the cationic monomer unit are used.

Acrylic Copolymer A-7

An acrylic copolymer A-7 is obtained by performing the same operation as the acrylic copolymer A-1 except that 54 parts by weight of butyl acrylate as the acrylic acid ester monomer unit, 40 parts by weight of methyl methacrylate as the methacrylic acid ester monomer unit, 5 parts by weight of vinyl acrylate as the monomer unit of the vinyl group containing compound (compound of Formula (1)), and 1 part by weight of 2-vinyl pyridine as the cationic monomer unit are used.

Acrylic Copolymer A-8

An acrylic copolymer A-8 is obtained by performing the same operation as the acrylic copolymer A-1 except that 45 parts by weight of butyl acrylate as the acrylic acid ester monomer unit, 40 parts by weight of methyl methacrylate as the methacrylic acid ester monomer unit, 5 parts by weight of vinyl acrylate as the monomer unit of the vinyl group containing compound (compound of Formula (1)), and 10 parts by weight of 2-vinyl pyridine as the cationic monomer unit are used.

Acrylic Copolymer A-9

An acrylic copolymer A-9 is obtained by performing the same operation as the acrylic copolymer A-1 except that 50 parts by weight of butyl acrylate as the acrylic acid ester monomer unit, 40 parts by weight of methyl methacrylate as the methacrylic acid ester monomer unit, 5 parts by weight of 1,1-dimethylpropenyl acrylate as the monomer unit of the vinyl group containing compound (compound of Formula (1)), and 5 parts by weight of 2-vinyl pyridine as the cationic monomer unit are used.

Acrylic Copolymer A-10

An acrylic copolymer A-10 is obtained by performing the same operation as the acrylic copolymer A-1 except that 50 parts by weight of butyl acrylate as the acrylic acid ester monomer unit, 40 parts by weight of methyl methacrylate as the methacrylic acid ester monomer unit, 5 parts by weight of vinyl acrylate as the monomer unit of the vinyl group containing compound (compound of Formula (1)), and 5 parts by weight of vinyl sulfonate as the cationic monomer unit are used.

Acrylic Copolymer A-11

An acrylic copolymer A-11 is obtained by performing the same operation as the acrylic copolymer A-1 except that 50 parts by weight of butyl acrylate as the acrylic acid ester monomer unit, 40 parts by weight of methyl methacrylate as the methacrylic acid ester monomer unit, 5 parts by weight of vinyl acrylate as the monomer unit of the vinyl group containing compound (compound of Formula (1)), and 5 parts by weight of dimethylaminoethyl acrylate as the cationic monomer unit are used.

Comparative Copolymer B-1

A comparative copolymer B-1 is obtained by performing the same operation as the acrylic copolymer A-1 except that 50 parts by weight of butyl acrylate as the acrylic acid ester monomer unit, and 50 parts by weight of methyl methacrylate as the methacrylic acid ester monomer unit are used.

Comparative Copolymer B-2

A comparative copolymer B-2 is obtained by performing the same operation as the acrylic copolymer A-1 except that 50 parts by weight of butyl acrylate as the acrylic acid ester monomer unit, 45 parts by weight of methyl methacrylate as the methacrylic acid ester monomer unit, and 5 parts by weight of vinyl acrylate as the monomer unit of the vinyl group containing compound (compound of Formula (1)) are used.

Comparative Copolymer B-3

A comparative copolymer B-3 is obtained by performing the same operation as the acrylic copolymer A-1 except that 50 parts by weight of butyl acrylate as the acrylic acid ester monomer unit, 45 parts by weight of methyl methacrylate as the methacrylic acid ester monomer unit, and 5 parts by weight of 2-vinyl pyridine as the cationic monomer unit are used.

Compositions of the acrylic copolymers A-1 to A-11 and the comparative copolymers B-1 to B-3 are presented in Table 1.

TABLE 1

| | Acrylic copolymer | | | | | | | | | | | Comparative copolymer | | |
|---|---|---|---|---|---|---|---|---|---|---|---|---|---|---|
| | A-1 | A-2 | A-3 | A-4 | A-5 | A-6 | A-7 | A-8 | A-9 | A-10 | A-11 | B-1 | B-2 | B-3 |
| Acrylic acid ester monomer unit | | | | | | | | | | | | | | |
| Butyl acrylate | 50 | | 70 | 20 | 53.5 | 45 | 54 | 45 | 50 | 50 | 50 | 50 | 50 | 50 |
| ethyl acrylate | | 50 | | | | | | | | | | | | |
| Methacrylic acid ester monomer unit | | | | | | | | | | | | | | |
| Methacrylate methyl | 40 | 30 | 20 | 70 | 40 | 40 | 40 | 40 | 40 | 40 | 40 | 50 | 45 | 45 |
| glycidyl methacrylate | | 10 | | | | | | | | | | | | |
| Monomer unit having structure of Formula (1) | | | | | | | | | | | | | | |
| Vinyl acrylate | 5 | | 5 | 5 | 1.5 | 10 | 5 | 5 | | 5 | 5 | | 5 | |
| vinyl methacrylate | | 5 | | | | | | | | | | | | |
| 1,1-dimethylpropenyl acrylate | | | | | | | | | 5 | | | | | |
| Cationic monomer unit | | | | | | | | | | | | | | |
| 2-vinyl pyridine | 5 | | 5 | 5 | 5 | 5 | 1 | 10 | 5 | | | | | 5 |
| dimethylaminoethyl acrylate | | 5 | | | | | | | | 5 | | | | |
| vinyl sulfonate | | | | | | | | | | | 5 | | | |

Example 1

100 parts by weight of a polylactic acid resin (Trade name: "Ingeo 4032D" manufactured by NatureWorks LLC, weight average molecular weight: 150,000), and 5 parts by weight of the acrylic copolymer A-1 are mixed and supplied to a blend feeder of a twin-screw extruder (TEX-30α manufactured by The Japan Steel Works, LTD.), and the molten kneading extrusion is performed at the working temperature of 190° C. At the time of molten kneading, a solution obtained by dissolving 0.2 parts by weight of a cross-linking agent (Trade name "Perhexa 25B", manufactured by NOF Corporation) in 1.0 parts by weight of a plasticizer (glycerin diaceto monocaprylate) is supplied to the blend feeder. Also, the resin discharged from the twin-screw extruder is cut into pellet form to obtain pellets. This is used as a modified polylactic acid resin 1 obtained by modification with the acrylic copolymer A-1.

100 parts by weight of the modified polylactic acid resin 1, and 5 parts by weight of water-swelling fluorine mica (Trade name: "Somasif ME-100" manufactured by Co-op Chemical Co., Ltd., swellability: 8) are mixed and supplied to a blend feeder of the twin-screw extruder (TEX-30α manufactured by The Japan Steel Works, LTD.), and the molten kneading extrusion is performed at the working temperature of 190° C. Then, the resin discharged from the twin-screw extruder is cut into pellet form to obtain pellets.

The obtained pellet-shaped resin composition is dried at 80° C. for 4 hours with a hot air dryer, and is injected and molded by the injection molding machine (Trade name: "NEX 500", manufactured by Nissei Plastic Industrial Co., Ltd.) at the cylinder temperature of 230° C. Heating and cooling molding in which the mold temperature rapidly decreased from 110° C., after the cooling of 50 seconds, to 60° C. is performed, and a predetermined resin molded article (test sample for evaluation) is obtained.

Example 2

A predetermined resin molded article (test sample for evaluation) is obtained in the same condition as in Example 1 except that a modified polylactic acid resin 2 is obtained by using the acrylic copolymer A-2 instead of the acrylic copolymer A-1.

Example 3

A predetermined resin molded article (test sample for evaluation) is obtained in the same condition as in Example 1 except that a modified polylactic acid resin 3 is obtained by using the acrylic copolymer A-3 instead of the acrylic copolymer A-1.

Example 4

A predetermined resin molded article (test sample for evaluation) is obtained in the same condition as in Example 1 except that a modified polylactic acid resin 4 is obtained by using the acrylic copolymer A-4 instead of the acrylic copolymer A-1.

Example 5

A predetermined resin molded article (test sample for evaluation) is obtained in the same condition as in Example 1 except that a modified polylactic acid resin 5 is obtained by using the acrylic copolymer A-5 instead of the acrylic copolymer A-1.

Example 6

A predetermined resin molded article (test sample for evaluation) is obtained in the same condition as in Example 1 except that a modified polylactic acid resin 6 is obtained by using the acrylic copolymer A-6 instead of the acrylic copolymer A-1.

Example 7

A predetermined resin molded article (test sample for evaluation) is obtained in the same condition as in Example 1 except that a modified polylactic acid resin 7 is obtained by using the acrylic copolymer A-7 instead of the acrylic copolymer A-1.

Example 8

A predetermined resin molded article (test sample for evaluation) is obtained in the same condition as in Example 1 except that a modified polylactic acid resin 8 is obtained by using the acrylic copolymer A-8 instead of the acrylic copolymer A-1.

Example 9

A predetermined resin molded article (test sample for evaluation) is obtained in the same condition as in Example 1 except that a modified polylactic acid resin 9 is obtained by using the acrylic copolymer A-9 instead of the acrylic copolymer A-1.

Example 10

A predetermined resin molded article (test sample for evaluation) is obtained in the same condition as in Example 1 except that a modified polylactic acid resin 10 is obtained by using the acrylic copolymer A-10 instead of the acrylic copolymer A-1.

Example 11

A predetermined resin molded article (test sample for evaluation) is obtained in the same condition as in Example 1 except that a modified polylactic acid resin 11 is obtained by using the acrylic copolymer A-11 instead of the acrylic copolymer A-1.

Comparative Example 1

A predetermined resin molded article (test sample for evaluation) is obtained in the same condition as in Example 1 except that a modified polylactic acid resin 12 is obtained by using the comparative copolymer B-1 instead of the acrylic copolymer A-1.

Comparative Example 2

A predetermined resin molded article (test sample for evaluation) is obtained in the same condition as in Example 1 except that a modified polylactic acid resin 13 is obtained by using the comparative copolymer B-2 instead of the acrylic copolymer A-1.

Comparative Example 3

A predetermined resin molded article (test sample for evaluation) is obtained in the same condition as in Example 1 except that a modified polylactic acid resin 14 is obtained by using the comparative copolymer B-3 instead of the acrylic copolymer A-1.

Test

Evaluations and tests are performed by using the obtained test samples for evaluations. Compositions of the resin compositions of Examples 1 to 11 (all presented with parts by weight), intercalation distances of layered silicates in the resin compositions, and results of the following tests are summarized in Table 2. In addition, compositions of the resin compositions of Comparative Examples 1 to 3 (all presented with parts by weight), intercalation distances of layered silicates in the resin compositions, and results of the following tests are summarized in Table 3. The intercalation distances of the layered silicates in the resin compositions are values measured by using an X-ray diffractometer (MX-labo manufactured by Mac Science Ltd.) and the same shall apply hereafter.

Test for Heat Resisting Property

In a state in which the load (0.45 MPa) determined by the standard test method of ASTM D648 is applied to the test samples, temperatures of the test samples for evaluation are increased, and temperatures at which sizes of deflections become specified values (deflection temperature under load: DTUL) are measured. These are evaluated as heat resistant temperatures.

Test for Bending Strength

Tests for bending strengths of test samples (or samples) are conducted by using a universal tester (Trade name "INSTRON 5581") manufactured by Instron conforming to JIS Z2204. The results are presented as bending elastic moduli. As a value of the bending elastic modulus is greater, bending strength is greater.

Test of Impact Resistance

Charpy impact resistance strengths (unit: $kJ/m^2$) in the MD direction are measured with the conditions of the rising angle of 150°, the using hammer energy of 2.0 J, and the measurement number n of 10, with a digital impact tester (DG-5 manufactured by Toyo Seiki Kogyo Co. Ltd.) conforming to JIS K7111, by using ISO multipurpose dumbbell test samples subjected to notch machining. As the Charpy impact resistance strength is greater, the impact resistance is better.

TABLE 2

| Resin composition | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Modified polylactic acid resin 1 (acrylic copolymer A-1 and polylactic acid resin) | 100 (100:5) | | | | | | | | | | |

TABLE 2-continued

| Resin composition | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Modified polylactic acid resin 2 (acrylic copolymer A-2 and polylactic acid resin) | | 100 (100:5) | | | | | | | | | |
| Modified polylactic acid resin 3 (acrylic copolymer A-3 and polylactic acid resin) | | | 100 (100:5) | | | | | | | | |
| Modified polylactic acid resin 4 (acrylic copolymer A-4 and polylactic acid resin) | | | | 100 (100:5) | | | | | | | |
| Modified polylactic acid resin 5 (acrylic copolymer A-5 and polylactic acid resin) | | | | | 100 (100:5) | | | | | | |
| Modified polylactic acid resin 6 (acrylic copolymer A-6 and polylactic acid resin) | | | | | | 100 (100:5) | | | | | |
| Modified polylactic acid resin 7 (acrylic copolymer A-7 and polylactic acid resin) | | | | | | | 100 (100:5) | | | | |
| Modified polylactic acid resin 8 (acrylic copolymer A-8 and polylactic acid resin) | | | | | | | | 100 (100:5) | | | |
| Modified polylactic acid resin 9 (acrylic copolymer A-9 and polylactic acid resin) | | | | | | | | | 100 (100:5) | | |
| Modified polylactic acid resin 10 (acrylic copolymer A-10 and polylactic acid resin) | | | | | | | | | | 100 (100:5) | |
| Modified polylactic acid resin 11 (acrylic copolymer A-11 and polylactic acid resin) | | | | | | | | | | | 100 (100:5) |
| Water-swelling fluorine mica | 5 | 5 | 5 | 5 | 5 | 5 | 5 | 5 | 5 | 5 | 5 |
| Intercalation distances of layered silicates in the composition (Å) | 7.8 | 7.6 | 6.5 | 8.2 | 5.5 | 8.0 | 4.4 | 8.5 | 6.2 | 4.2 | 7.6 |
| Evaluation result | | | | | | | | | | | |
| DTUL (0.45 MPa) | 128 | 126 | 124 | 131 | 122 | 127 | 117 | 132 | 124 | 114 | 127 |
| Bending elastic modulus (%) | 5900 | 5850 | 5820 | 5880 | 5500 | 5950 | 5490 | 6020 | 5700 | 5350 | 5800 |
| Charpy impact strength (kJ/m$^2$) | 9.8 | 8.4 | 10.2 | 6.5 | 7.6 | 7.9 | 6.4 | 7.2 | 7.5 | 6.0 | 8.6 |

TABLE 3

| Resin composition | Comparative Example 1 | Comparative Example 2 | Comparative Example 3 |
|---|---|---|---|
| Modified polylactic acid resin 12 (comparative acrylic copolymer B-1 and polylactic acid resin) | 100 (100:5) | | |
| Modified polylactic acid resin 13 (comparative acrylic copolymer B-2 and polylactic acid resin) | | 100 (100:5) | |
| Modified polylactic acid resin 14 (comparative acrylic copolymer B-3 and polylactic acid resin) | | | 100 (100:5) |
| Water-swelling fluorine mica | 5 | 5 | 5 |
| Intercalation distances of layered silicates in the composition (Å) | 1.8 | 2.1 | 2.5 |
| Evaluation result | | | |
| DTUL (0.45 MPa) | 98 | 100 | 102 |
| Bending elastic modulus (%) | 4880 | 4950 | 5010 |
| Charpy impact strength (kJ/m$^2$) | 1.9 | 1.8 | 1.7 |

As understood in Tables 2 and 3, the resin molded articles of Examples 1 to 11 obtained from resin compositions including the modified polylactic acid resins 1 to 11 modified by acrylic copolymers including acrylic acid ester monomer units, methacrylic acid ester monomer units, monomer units of vinyl group containing compounds (compounds of Formula (1)), and cationic monomer units, and layered silicate have improved heat resisting properties and impact resistance and also improved bending strength, compared with the resin molded article of Comparative Example 1 obtained from the resin composition including the modified polylactic acid resin 12 modified by the acrylic copolymer configured with an acrylic acid ester monomer unit and a methacrylic acid ester monomer unit, and a layered silicate. In addition, the resin molded articles of Examples 1 to 11 have improved heat resisting properties and impact resistance, and also improved bending strength, compared with the resin molded articles of Comparative Examples 2 to 3 obtained from the resin compositions including the modified polylactic acid resins 13 to 14 modified by the acrylic copolymers configured with acrylic acid ester monomer units, methacrylic acid ester monomer units, and monomer units of vinyl group containing compounds (compounds of Formula (1)), or cationic monomer units, and layered silicates.

The acrylic copolymer used for producing the resin molded articles of Examples 1, 10, and 11 are measured by a solid-state NMR spectroscopy (AS300 manufactured by BRUKER Corporation) to find that the acrylic copolymers of Examples 1 and 11 have amino groups and pyridinium groups derived from cationic monomer units, and the acrylic copolymer of Example 10 has a sulfonium group derived from a cationic monomer unit. Also, the resin molded articles of Examples 1 and 11 using acrylic copolymers having amino groups and pyridinium groups have improved heat resisting properties and impact resistance compared with the resin molded article of Example 10 using the acrylic copolymer having the sulfonium group.

Example 12

A predetermined resin molded article (test sample for evaluation) is obtained in the same condition as in Example 1 except that a modified polylactic acid resin 15 is obtained by using 1.5 parts by weight of the acrylic copolymer A-1.

Example 13

A predetermined resin molded article (test sample for evaluation) is obtained in the same condition as in Example 1 except that a modified polylactic acid resin 16 is obtained by using 9 parts by weight of the acrylic copolymer A-1.

Example 14

A predetermined resin molded article (test sample for evaluation) is obtained in the same condition as in Example 1 except that a modified polylactic acid resin 17 is obtained by using 0.5 parts by weight of the acrylic copolymer A-1.

Example 15

A predetermined resin molded article (test sample for evaluation) is obtained in the same condition as in Example 1 except that a modified polylactic acid resin 18 is obtained by using 12 parts by weight of the acrylic copolymer A-1.

Evaluations and tests are performed by using the obtained test samples for evaluations in the same manner as in Example 1. Compositions of the resin compositions of Examples 12 to 15 (all presented with parts by weight), intercalation distances of layered silicates in the resin compositions, and results of the above tests are summarized in Table 4.

TABLE 4

|  | Example 12 | Example 13 | Example 14 | Example 15 |
|---|---|---|---|---|
| Resin composition |  |  |  |  |
| Modified polylactic acid resin 15 (acrylic copolymer A-1 and polylactic acid resin) | 100 (100:1.5) |  |  |  |
| Modified polylactic acid resin 16 (acrylic copolymer A-1 and polylactic acid resin) |  | 100 (100:9) |  |  |
| Modified polylactic acid resin 17 (acrylic copolymer A-1 and polylactic acid resin) |  |  | 100 (100:0.5) |  |
| Modified polylactic acid resin 18 (acrylic copolymer A-1 and polylactic acid resin) |  |  |  | 100 (100:12) |
| Water-swelling fluorine mica | 5 | 5 | 5 | 5 |
| Intercalation distances of layered silicates in the composition (Å) | 4 | 7.6 | 3.2 | 7.4 |
| Evaluation result |  |  |  |  |
| DTUL (0.45 MPa) | 115 | 125 | 110 | 124 |
| Bending elastic modulus (%) | 5400 | 5750 | 5140 | 5540 |
| Charpy impact strength (kJ/m$^2$) | 6.0 | 6.8 | 3.9 | 3.7 |

As understood in Tables 2 and 4, compared with the resin molded articles of Examples 14 and 15 of which the content of the acrylic copolymer is less than 1.5% by weight, or exceeds 9% by weight with respect to the polylactic acid resin of 100 parts by weight, the resin molded articles of Examples 1, 12, and 13 of which the content of the acrylic copolymer is in the range of 1.5% by weight to 9% by weight with respect to the polylactic acid resin of 100 parts by weight is preferable in view of the heat resisting property and the impact resistance, and the resin molded articles of Examples 1 and 12 of which the content of the acrylic copolymer is in the range of 1.5% by weight to 5% by weight with respect to the polylactic acid resin of 100 parts by weight are more preferable.

Example 16

A predetermined resin molded article (test sample for evaluation) is obtained in the same condition as in Example 1 except that water-swelling bentonite (Trade name "Kunipia F", manufactured by Kunimine Industries Co., Ltd.) is used as the layered silicate.

Example 17

A predetermined resin molded article (test sample for evaluation) is obtained in the same condition as in Example 1 except that nonswellable montmorillonite (Trade name "Esben W" manufactured by Hojun. Co., Ltd., montmorillonite of which intercalation ion is substituted with a dioctadecyldimethylammonium ion, swellability: 1 or less) is used as the layered silicate.

Example 18

A predetermined resin molded article (test sample for evaluation) is obtained in the same condition as in Example 1 except that 20 parts by weight of the modified polylactic acid resin A-1, 80 parts by weight of an unmodified polylactic acid resin, and 5 parts by weight of water-swelling fluorine mica are mixed.

Example 19

A predetermined resin molded article (test sample for evaluation) is obtained in the same condition as in Example 1 except that 20 parts by weight of the modified polylactic acid resin A-1, 80 parts by weight of an unmodified polylactic acid resin, and 5 parts by weight of a nonswellable montmorillonite are mixed.

Tests are performed by using the obtained test samples for evaluations in the same manner as in Example 1. Compositions of the resin compositions of Examples 16 to 19 (all presented with parts by weight), intercalation distances of layered silicates in the resin compositions, and results of the above tests are summarized in Table 5.

TABLE 5

|  | Example 16 | Example 17 | Example 18 | Example 19 |
|---|---|---|---|---|
| Resin composition |  |  |  |  |
| Polylactic acid resin |  |  | 80 | 80 |
| Modified polylactic acid resin 1 | 100 | 100 | 20 | 20 |

TABLE 5-continued

|  | Example 16 | Example 17 | Example 18 | Example 19 |
|---|---|---|---|---|
| Water-swelling fluorine mica |  |  | 5 | 5 |
| Water swelling bentonite | 5 |  |  |  |
| Nonswellable Montmorillonite |  | 5 |  | 5 |
| Intercalation distances of layered silicates in the composition (Å) | 8.2 | 3.2 | 3.1 | 2.2 |
| Evaluation result |  |  |  |  |
| DTUL (0.45 MPa) | 129 | 108 | 107 | 103 |
| Bending elastic modulus (%) | 6020 | 5150 | 5090 | 5050 |
| Charpy impact strength (kJ/m$^2$) 1/8"@23° C. | 8.5 | 3.5 | 2.4 | 2.2 |

As understood in Table 5, the resin molded articles of Examples 16 and 18 using water-swelling layered silicate have more enhanced heat resisting properties and more enhanced impact resistance than the resin molded articles of Examples 17 and 19 using nonswellable layered silicate.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
a modified polylactic acid resin modified by a modifying agent, wherein
the modifying agent comprises an acrylic copolymer containing an acrylic acid ester monomer unit, a methacrylic acid ester monomer unit, a monomer unit of a compound represented by Formula (1), and a cationic monomer unit:

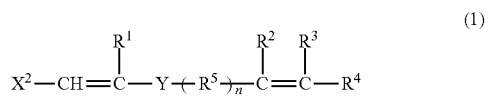

(1)

wherein R$^1$ is a hydrogen atom or a methyl group; R$^2$, R$^3$, and R$^4$ are hydrogen atoms or organic groups having 1 to 10 carbon atoms in which hydrogen does not exist in carbon adjacent to a double bond; R$^5$ is an organic group having 1 to 10 carbon atoms in which hydrogen does not exist in carbon adjacent to a double bond, X$^2$ is a hydrogen atom; Y is

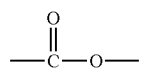

or —O—; and n is 1 or 0, and
the modified polylactic acid resin is modified by the modifying agent by way of a vinyl group of the monomer unit of the compound represented by Formula (1) of the modifying agent and a carbon atom of a polylactic acid resin being bonded; and
a layered silicate.

2. The resin composition according to claim 1,
wherein the acrylic copolymer has a cationic functional group, and
wherein a cationic group of the cationic monomer unit, which is a cationic functional group of the acrylic copolymer, is an amino group or a pyridinium group.

3. The resin composition according to claim 1,
wherein the layered silicate has water-swelling property.

4. A resin molded article comprising:
the resin composition according to claim 1.

* * * * *